(12) United States Patent
Witt et al.

(10) Patent No.: US 12,502,801 B2
(45) Date of Patent: Dec. 23, 2025

(54) HANDHELD, PORTABLE WORK APPARATUS

(71) Applicant: Andreas Stihl AG & Co. KG, Waiblingen (DE)

(72) Inventors: Marcel Witt, Alfdorf (DE); Alexander Scheel, Schwaebisch Gmuend (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 18/615,873

(22) Filed: Mar. 25, 2024

(65) Prior Publication Data

US 2024/0326281 A1  Oct. 3, 2024

(30) Foreign Application Priority Data

Mar. 27, 2023 (DE) ................... 10 2023 107 725.2
Jul. 24, 2023 (DE) ................... 10 2023 119 535.2

(51) Int. Cl.
*B25F 5/02* (2006.01)
*B27B 17/08* (2006.01)

(52) U.S. Cl.
CPC .............. *B27B 17/083* (2013.01); *B25F 5/02* (2013.01)

(58) Field of Classification Search
CPC ................................. B27B 17/083; B25F 5/02
See application file for complete search history.

(56) References Cited

U.S. PATENT DOCUMENTS

| | | | | |
|---|---|---|---|---|
| 3,664,390 A | * | 5/1972 | Mattsson | B27B 17/083 477/185 |
| 3,923,126 A | * | 12/1975 | Bidanset | F16D 49/04 188/166 |
| 4,432,139 A | * | 2/1984 | Kohler | B27B 17/083 30/381 |
| 4,573,556 A | * | 3/1986 | Andreasson | F16P 7/02 188/137 |
| 4,680,862 A | * | 7/1987 | Wieland | H02P 3/06 83/DIG. 1 |
| 4,683,660 A | * | 8/1987 | Schurr | F16D 49/08 30/381 |
| 4,811,487 A | * | 3/1989 | Takahashi | B27B 17/083 188/166 |

(Continued)

FOREIGN PATENT DOCUMENTS

DE   10 2020 002 073 A1   10/2020
EP      2 087 973 A1    8/2009

(Continued)

*Primary Examiner* — Lucas E. A. Palmer
(74) *Attorney, Agent, or Firm* — Walter Ottesen, P.A.

(57) ABSTRACT

A handheld, portable work apparatus includes a housing defining an interior space, a drive motor arranged in the housing for driving a tool, a brake device assigned to the tool, a hand guard, and a switching unit which is arranged in the interior space of the housing for detecting the position of the brake device. The hand guard is arranged outside the housing and has an actuation contour for actuating the switching unit. The housing has an elastic element. The hand guard, the elastic element and the switching unit are arranged relative to one another such that the switching unit can be actuated by the elastic element being pushed in via the actuation contour of the hand guard.

11 Claims, 3 Drawing Sheets

(56) References Cited

U.S. PATENT DOCUMENTS

| | | | |
|---|---|---|---|
| 5,813,123 A * | 9/1998 | Wieland | B27B 17/083 |
| | | | 30/381 |
| 5,990,431 A | 11/1999 | Wright | |
| 6,878,888 B1 * | 4/2005 | Jong | H01H 9/06 |
| | | | 200/332.2 |
| 2009/0193669 A1 | 8/2009 | Goreflo | |
| 2011/0078910 A1 * | 4/2011 | Tomita | H02P 3/22 |
| | | | 173/217 |
| 2012/0067608 A1 * | 3/2012 | Heinzelmann | B25F 5/02 |
| | | | 173/217 |
| 2014/0047722 A1 * | 2/2014 | Onose | B25F 5/02 |
| | | | 30/383 |
| 2015/0251258 A1 | 9/2015 | Jiang et al. | |
| 2015/0283631 A1 * | 10/2015 | Seki | F02D 11/04 |
| | | | 30/381 |
| 2018/0361555 A1 * | 12/2018 | Miaowu | A01D 34/84 |
| 2020/0306948 A1 * | 10/2020 | Osawa | A01G 3/086 |
| 2020/0338780 A1 * | 10/2020 | Watanabe | B27B 17/12 |
| 2020/0384664 A1 * | 12/2020 | Yang | B27B 17/083 |

FOREIGN PATENT DOCUMENTS

| | | | | |
|---|---|---|---|---|
| EP | 2230056 A1 * | 9/2010 | | B27B 17/083 |
| EP | 2 926 647 A1 | 10/2015 | | |
| RU | 2629107 C2 * | 8/2017 | | B27B 17/083 |
| WO | WO-2023197732 A1 * | 10/2023 | | A01G 23/091 |

* cited by examiner

HANDHELD, PORTABLE WORK APPARATUS

CROSS-REFERENCE TO RELATED APPLICATIONS

This application claims priority of German patent application nos. 10 2023 107 725.2, filed Mar. 27, 2023 and 10 2023 119 535.2, filed Jul. 24, 2023, the entire contents of which are incorporated herein by reference.

BACKGROUND

A motorized chain saw with a brake device is disclosed in US 2009/0193669. The brake device serves for indirectly securing and releasing the tool, that is, the saw chain. The motorized chain saw is held via two handles, a rear handle and a front gripping bar which encompasses the housing. A hand guard is mounted in front of the gripping bar, the hand guard being secured to the housing of the motorized chain saw so as to be pivotable about an axis and serving as a trigger for the brake device.

A sensor which is arranged in the interior space of the housing is assigned to the hand guard, the sensor detecting the positions of the hand guard and thereby also the state of the brake device. A part of the hand guard is a lever mechanism which protrudes via a housing opening into the interior space and actuates the brake device and the sensor therein. The output signal of the sensor is transmitted to a control unit of the motorized chain saw and processed therein.

A drawback in the motorized chain saw known from the prior art is the susceptibility to contamination of the interior space in the region of the housing opening for the hand guard.

SUMMARY

It is thus an object of the disclosure to specify a work apparatus which permits a detection of the state of the brake device and at the same time has a minimal susceptibility to contamination of the interior space of the housing.

This object is, for example, achieved by a handheld, portable work apparatus including: a housing defining an interior space; a drive motor arranged in the housing for driving a tool; a brake device assigned to the tool; a hand guard for actuating the brake device; the hand guard being configured to be switched into an operating position and into an actuation position; a switching unit arranged in the interior space of the housing for detecting a position of the hand guard; the hand guard having an actuation contour for actuating the switching unit; the housing having an elastic element; and, the hand guard, the elastic element, and the switching unit being arranged relative to one another such that the switching unit is actuatable by the elastic element being pushed in via the actuation contour of the hand guard.

A handheld, portable work apparatus according to the disclosure can be configured, in particular, as a motorized chain saw. The work apparatus includes a housing, wherein the housing defines an interior space, a drive motor arranged in the housing for driving a tool, a hand guard for actuating a brake device assigned to the tool, wherein the hand guard can be switched into an operating position and into an actuation position, a switching unit which is arranged in the interior space of the housing for detecting the position of the hand guard, wherein the hand guard has an actuation contour for actuating the switching unit, wherein the housing has an elastic element and wherein the hand guard, the elastic element and the switching unit are arranged relative to one another such that the switching unit can be actuated by the elastic element being pushed in via the actuation contour of the hand guard.

The switching unit is activated only indirectly via the actuation contour of the hand guard. The elastic element is functionally connected between the actuation contour of the hand guard and the actuating element of the switching unit. A movement of the actuating element of the switching unit is carried out by the deformation of the elastic element which is brought about by the actuation contour of the hand guard, whereby in turn the switching unit is activated. This embodiment also permits a spatial separation between the actuation contour of the hand guard and the actuating element of the switching unit. An opening in the housing via which a lever mechanism or the like protrudes into the interior space of the housing is no longer required. A force is transmitted by the elastic element between the actuation contour and the actuating element of the switching unit. At the same time, the housing is closed by the elastic element and protected relative to a penetration of dirt particles.

It can advantageously be provided that the switching unit has an actuating element for actuating the switching unit, wherein the actuating element is arranged adjacent to the elastic element of the housing such that the actuating element of the switching unit can be actuated directly via the elastic element. In an alternative embodiment, it can also be provided that a transmission unit, for example a lever mechanism or the like, is provided between the elastic element and the actuating element. Such an arrangement makes it possible to arrange the actuating element spaced apart from the elastic element. The switching unit is configured as a microswitch. Alternatively, the switching unit can also have a sensor, for example a proximity sensor, which is triggered via the actuating element.

It can advantageously be provided that the elastic element is configured as an insert for an opening in the housing, wherein the interior space of the housing is sealingly closed by the elastic element on the opening relative to dirt particles and/or moisture. The elastic element thus forms a seal against dirt particles, whereby a contamination of the interior space of the housing is avoided. Dirt particles can be, for example, sawdust. A further advantageous effect of the sealed housing section is that the fan impeller of the work apparatus can generate a cool air flow more effectively. The cool air flow is thus suctioned in at the cool air intake provided therefor. Due to the targeted reduction of leakages, cool air can be provided in an efficient manner for the drive motor and/or electronics.

Particularly advantageously, the housing can have a plurality of housing parts, wherein the elastic element is held between two housing parts. During assembly, the elastic element is first attached to one housing part. Then the further housing part is fastened to the one housing part, wherein the elastic element is, in particular, clamped and/or positively held between the housing parts. Further fastening elements are not required. Thus the fastening of the elastic element is exceptionally simple. In an alternative embodiment, the elastic element is injection molded onto the housing.

It can advantageously be provided that the elastic element has an upper sealing lip, a lower sealing lip and a groove which is configured between the sealing lips, and that the housing has, on the opening of the housing, a peripheral holding contour which protrudes into the groove of the elastic element. This embodiment of the elastic element firstly permits a simple fastening of the elastic element to the housing and secondly it brings about a particularly advantageous seal of the interior space of the housing against dirt particles.

It can preferably be provided that the hand guard has a contact surface facing the elastic element, wherein the actuation contour of the hand guard is configured as an elevation relative to the contact surface in the direction of the elastic element. The actuation contour is preferably configured in one piece with the hand guard. The contact surface of the hand guard is preferably configured as a stop relative to the housing for limiting the penetration depth of the actuation contour into the elastic element. Thus the penetration depth of the actuation contour, in particular the elevation, is limited in the elastic element. Thus the deformation of the elastic element is limited. An overload of the elastic element is thus avoided. As a result, the movement of the elastic element toward the switching unit is restricted. The deformation is configured such that the switching unit is actuated but a further movement of the actuating element is prevented so that the actuating element is not damaged.

It can preferably be provided that the elastic element has an outer side facing the actuation contour, wherein the actuation contour is in contact with the outer side of the elastic element approximately centrally in the actuation position of the hand guard. Thus the elastic element is uniformly deformed by the actuation contour.

The elastic element can be formed from an elastomer, in particular from a soft rubber.

BRIEF DESCRIPTION OF DRAWINGS

The invention will now be described with reference to the drawings wherein.

DETAILED DESCRIPTION

Figure 1:
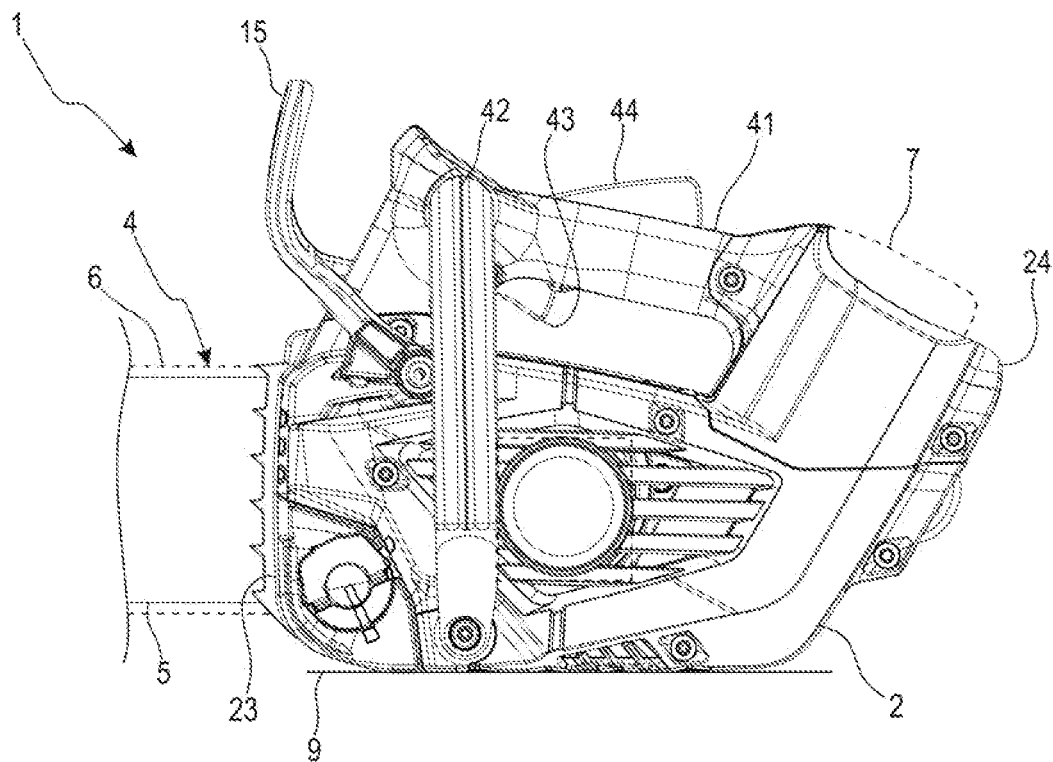
FIG. 1 shows a motorized chain saw with a guide bar arranged thereon, in a partially schematic side view.

FIG. 1 shows the work apparatus 1 according to the disclosure which is configured as a motorized chain saw. The work apparatus 1 includes a housing 2 in which a drive motor 3 is arranged for driving a tool 4. The drive motor 3 is configured in the embodiment as an electric motor. The drive motor 3 is shown schematically by a rectangle in dashed lines. The electric motor is supplied with electrical energy via at least one battery pack 7. The battery pack 7 is shown in FIG. 1 merely by a dashed line. In an alternative embodiment, the drive motor 3 can also be supplied with electrical energy via a connection cable which is connected to a power supply system. In an alternative embodiment of the work apparatus 1 the drive motor 3 is configured as an internal combustion engine.

As shown in FIG. 1, the housing 2 extends from a front end 23 to a back end 24. The tool 4 which is shown merely schematically is arranged on the front end 23 of the housing 2. The tool 4 is configured as a saw chain 6 which is driven in circulation on a guide bar 5 by the drive motor 3 via a drive element. The drive element is not shown in more detail. The drive element is driven in rotation by the drive motor 3. In the embodiment, the drive element is a clutch drum of a centrifugal clutch on which a chain wheel, not shown in more detail, is arranged fixedly in terms of rotation. The chain wheel in turn drives the saw chain 6. The guide bar 5 is arranged at the front end 23 of the housing 2 and starting from the front end 23 extends in the direction of the back end 24 relative to the front end 23. The guide bar 5 thus protrudes at the front end 23 of the housing 2 beyond the housing 2.

As shown in FIG. 1, the work apparatus 1 includes a rear handle 41 and a front handle 42 for guiding and bearing the work apparatus 1. Within the meaning of this application the term "portable" means that the work apparatus 1 is carried when operated as intended. The rear handle 41 is configured on the housing 2. An operator controlled element 43 and a blocking element 44 are assigned to the rear handle 41. In the embodiment, the operator controlled element 43 is configured as an operating lever. In the embodiment, the blocking element 44 is configured as a blocking lever. The blocking element 44 is operatively connected to the operator controlled element 43. The blocking element 44 serves for releasing and blocking the operator controlled element 43. If the operator controlled element 43 is released via the blocking lever 44, the drive motor 3 can be activated or the speed of the drive motor 3 controlled via the operator controlled element 43.

As shown in FIG. 1 the work apparatus is configured as a "top handle" motorized saw or as a tree saw. Accordingly, the rear handle 41 is arranged on a top side of the work apparatus 1. The front handle 42 adjoins the rear handle 41. In an alternative embodiment of the work apparatus 1, it is configured as a "rear handle" motorized saw, that is, as a motorized saw with a standard handle. In such an embodiment, the rear handle 41 forms the back end 24 of the housing 2. The front handle 42, which is configured in particular as a gripping bar, encompasses the housing 2 from a longitudinal side over the top side to the other longitudinal side of the housing 2.

Figure 2:
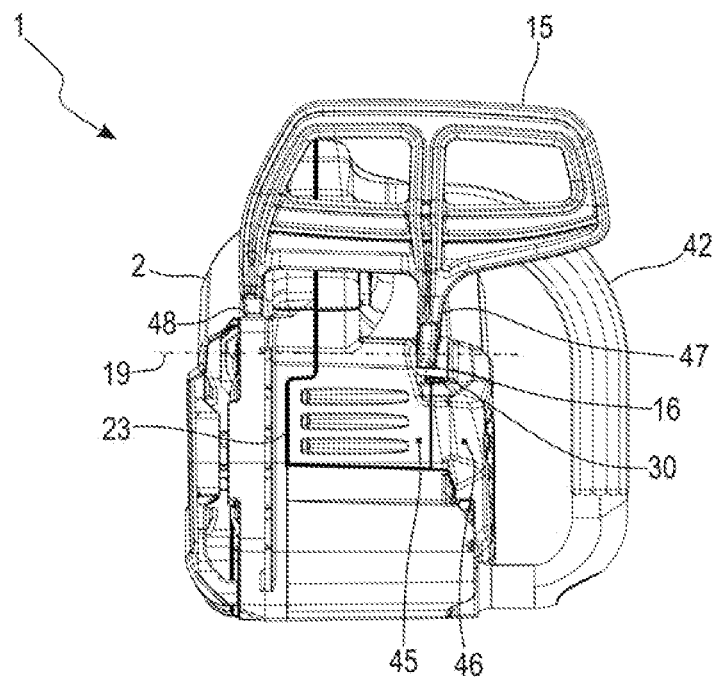
FIG. 2 shows the motorized chain saw according to FIG. 1 without the guide bar, in a view from the front.

As shown in FIGS. 1 and 2, a hand guard 15 is mounted in front of the front handle 42. In the embodiment, the hand guard 15 is configured as a bow-shaped bar. The hand guard 15 is pivotably secured to the housing 2. The hand guard 15 serves as a trigger for a brake device of the work apparatus 1, not shown in more detail. Such brake devices for motorized chain saws are very well known from the prior art.

The brake device can be a mechanical and/or electrical brake device.

A mechanical brake device can include a brake belt which is secured with one end to the housing and with the other end to a brake lever. In a mechanical brake device, in particular, the brake lever is held pivotably relative to the housing 2 and coupled to a brake spring. A lever mechanism, not shown in more detail, is provided on the hand guard 15. In the actuation position 22 of the hand guard 15 the lever mechanism releases the brake lever, whereby the brake device is activated. The brake lever is subjected to a spring force by the brake spring, such that the brake belt comes to bear against a brake surface of the drive element, whereby the tool 4 is braked. In an operating position 21 of the hand guard 15, the lever mechanism of the hand guard 15 acts on the brake lever such that the brake belt is released from the drive element, whereby the brake device is deactivated. The tool 4 can be driven.

Figure 3:
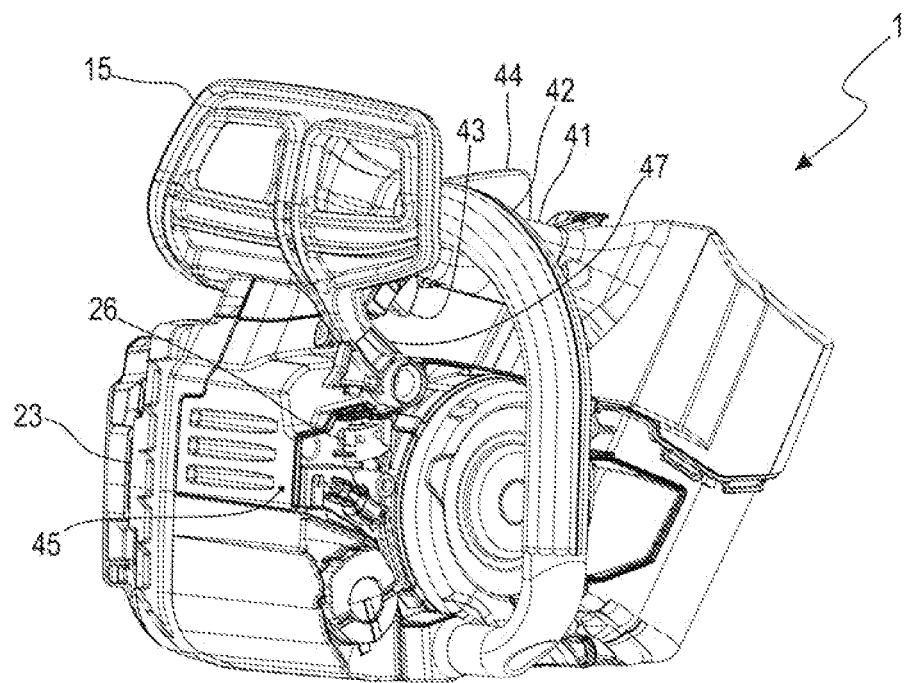
FIG. 3 shows the motorized chain saw according to FIG. 1 without the volute casing cover, in a perspective view.
Figure 4:
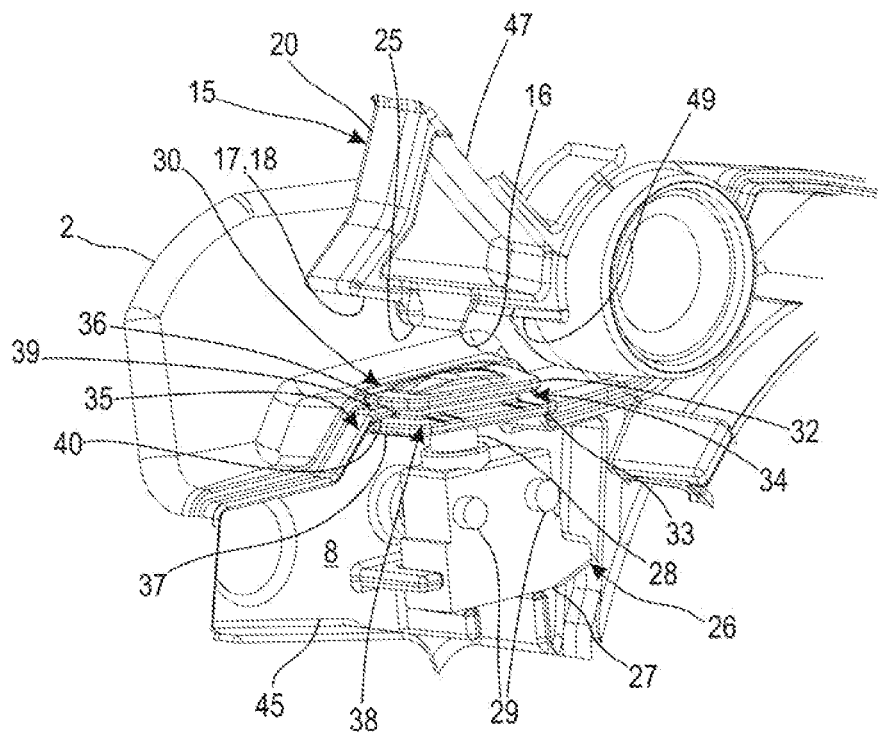
FIG. 4 shows the elastic element of the motorized chain saw, in a detailed view.

As shown in FIGS. 3 and 4, the work apparatus 1 includes a switching unit 26. In the embodiment, the switching unit 26 is arranged entirely in the interior space 8 of the housing 2. The interior space 8 is defined by the housing 2. In the present embodiment, the interior space 8 is defined by a volute casing 45 and a cover 46 of the volute casing 45. In an alternative embodiment, it can also be provided to arrange the switching unit 26 in a different interior space of the housing 2. The switching unit 26 serves for detecting the position of the hand guard 15. The switching unit 26 is switchable at least into an activated and a deactivated state. If the switching unit 26 is activated, it outputs a corresponding output signal to a control unit, not shown in more detail, of the work apparatus 1. The output signal of the switching unit 26 is processed further in the control unit. On the basis of the output signal of the switching unit 26 the control unit identifies the state of the switching unit 26 and thus also the position of the hand guard 15. The switching unit 26 has an actuating element 28 for the activation or deactivation.

As shown in FIGS. 3 and 4, an elastic element 30 is provided on the housing 2. Moreover an actuation contour 16 is configured on the hand guard 15. The actuation contour 16 is arranged outside the housing 2. The hand guard 15 can preferably be arranged entirely outside the housing 2. The elastic element 30 is arranged on the housing 2 such that in one of its positions 21, 22 the hand guard 15 pushes in the elastic element 30 with the actuation contour 16. The elastic element 30 is arranged on the housing 2 such that in one of its positions 21, 22, in particular in the actuation position 22, the hand guard 15 pushes in the elastic element 30 with the actuation contour 16. The actuating element 28 of the switching unit 26 is actuated via the elastic element 30.

In the embodiment, the elastic element 30 is configured as an insert for an opening 31 in the housing 2. The elastic element 30 is inserted into the opening 31 of the housing 2, whereby the elastic element 30 closes the opening 31 of the housing 2.

As shown in particular in FIG. 4, the elastic element 30 has an inner side 37 facing the interior space 8 of the housing 2. The inner side 37, in particular, also faces the actuating element 28 of the switching unit 26. The outer side 36 of the elastic element 30 is configured opposing the inner side 37. The outer side 36 faces the actuation contour 16 of the hand guard 15. The outer side 36 and the inner side 37 of the elastic element 30 are connected via a peripheral side 38 of the elastic element 30. The elastic element, in particular, is configured to be flat. Alternatively, the elastic element 30 can also be configured to be bulged or in a similar manner. The elastic element 30 has an upper sealing lip 32 and a lower sealing lip 33. The sealing lips 32, 33 are configured on the peripheral side 38 of the elastic element 30. A groove 34 is configured between the upper sealing lip 32 and the lower sealing lip 33 of the elastic element 30. The groove 34 is also part of the peripheral side 38 of the elastic element 30. In the embodiment, the sealing lips 32, 33 and the groove 34 circulate entirely around the peripheral side 38 of the elastic element 30.

The housing 2 has a holding contour 35 on its opening 31. The elastic element 30 is arranged on the holding contour 35. In particular, the elastic element 30 is held in a clamped manner on the holding contour 35. The holding contour 35 engages in the groove 34 of the elastic element 30. Alternatively, the elastic element 30 can be inserted in a receiving contour of the housing 2. The holding contour 35 has a top side 39 and a bottom side 40. The upper sealing lip 32 bears against the top side 39 of the holding contour 35. The top side 39 of the holding contour 35 is arranged relative to the outer side of the housing 2 offset toward the interior space 8 approximately by the thickness of the upper sealing lip 32 of the elastic element 30. The lower sealing lip 33 bears against the bottom side 40 of the holding contour 35. Thus the elastic element 30 forms an approximately flush outer contour with the housing 2. In the embodiment, the holding contour 35 extends entirely around the opening 31. As both the sealing lips 32, 33 and the holding contour 35 extend entirely around the opening 31, they form an effective seal relative to dirt particles. A penetration of dirt particles via the opening 31 into the interior space 8 can be avoided thereby.

As shown in FIGS. 1, 3 and 4 the opening 31 is configured on two housing parts of the housing 2. In the embodiment, the housing parts are the volute casing 45 and the cover 46 for closing the volute casing 45. Accordingly the elastic element 30 is held between the volute casing 45 and the cover 46. During assembly of the work apparatus 1, the elastic element 30 is positioned on the volute casing 45 so that the holding contour 35 of the volute casing 45 protrudes into the groove 34 of the elastic element 30. Then the cover 46 is pushed onto the volute casing 45 so that the holding contour 35 of the cover engages in the groove 34 of the elastic element 30. Alternatively, the holding contour 35 can be configured on one respective housing part, for example on the volute casing 45 or the cover 46, and covered or completed by the other housing part. The housing parts 45, 46 are configured from a substantially rigid material. The elastic element 30, however, is formed from an elastic material, preferably from an elastomer, in particular from a soft rubber. As a result, an elastic deformation of the elastic element 30 is made possible.

As shown in particular in FIG. 2, the hand guard 15 is secured to the housing 2 via a first leg 47 and a second leg 48 so as to be pivotable about the axis 19. In particular, the actuation contour 16 is arranged on the first leg 47 of the hand guard 15. As shown in particular in FIG. 4, the actuation contour 16 is part of a leg projection 20. The leg projection 20 is configured in a rib-like manner on the front side of the first leg 47 of the hand guard 15. The front side of the first leg 47 is the side of the first leg 47 facing away from the front handle 42. The front side of the first leg 47 is the side facing the guide bar 5. The leg projection 20 has a bottom side 49 facing the elastic element 30. A contact surface 17 is configured on the bottom side 49. If the hand guard 15 is pivoted to the front, the contact surface 17 of the leg projection 20 comes into contact with the housing 2 in the vicinity of the opening 31. Thus the contact surface 17 of the leg projection 20 forms a stop 18, whereby the pivoting movement of the hand guard 15 in the forward direction is limited. The actuation contour 16 is also configured on the bottom side 49 of the leg projection 20. The actuation contour 16 is configured as an elevation 25 relative to the contact surface 17 in the direction of the elastic element 30. In particular, the elevation 25 is configured to be raised relative to the housing contour of the housing 2 by 5 to 15 mm, in particular by 7 to 11 mm.

Figure 5:
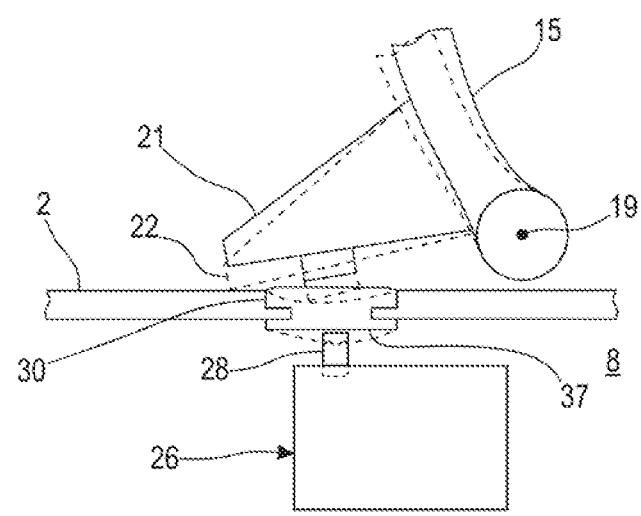
FIG. 5 shows an arrangement of the actuation contour, the elastic element and the switching unit in an operating position and in an actuation position of the hand guard of the work apparatus, in a schematic view.

As shown in particular in FIGS. 4 and 5, the contact surface 17, the actuation contour 16, the elastic element 30 and the actuating element 28 of the switching unit 26 are arranged relative to one another such that in the actuation position 22 of the hand guard 15, the contact surface 17 bears against the housing 2 and the actuation contour 16 pushes in the elastic element 30 such that the actuating element 28 of the switching unit 26 is actuated. The view in dashed lines shows schematically the hand guard 15 in the actuated position 22. The view in solid lines shows the hand guard 15 in the operating position 21. The elastic element 30 is brought into contact approximately centrally on the outer side 36 by the actuation contour 16 of the hand guard 15. As a result, the elastic element 30 is uniformly deformed when pushed in by the actuation contour 16.

As shown in FIG. 4, the switching unit 26 is configured from a microswitch 27. The microswitch 27 is fastened, in particular, to the housing 2 via two holding lugs 29 of the housing 2. The microswitch 27 is simply pushed onto the two holding lugs 29. The actuating element 28 is part of the microswitch 27, and accordingly the actuating element 28 is integrated in the microswitch 27. The microswitch 27 is oriented such that the actuating element 28 faces the elastic element 30, thus in the present case is oriented upwardly. The term "upwardly" refers to a state of the work apparatus 1 in which the work apparatus 1 is deposited with its bottom side on horizontal flat ground 9. In the operating position 21 of the hand guard 15, the actuating element 28 is arranged adjacent to the elastic element 30 such that in the actuation position 22 of the hand guard 15 this actuating element is pushed in by the actuation contour 16 of the hand guard 15 via the elastic element 30 and is actuated. Thus the actuating element 28 of the switching unit 26 is pushed in directly by the elastic element 30 and actuated. The actuation contour 16 is configured, in particular, in one piece with the hand guard 15.

In an alternative embodiment of the work apparatus 1, it can also be provided that a transmission unit is interposed between the actuating element 28 and the elastic element 30. The transmission unit transmits the deformation of the elastic element 30 to the actuating element 28, whereby the switching unit 26 is activated. Thus the switching unit 26 can also be arranged spaced apart from the elastic element 30 on the housing 2. By the use of a transmission unit, an arrangement of the switching unit 26 is also conceivable in which the actuating element 28 is arranged facing away from the elastic element 30. In a further embodiment of the work apparatus 1, not shown, it is provided that the switching unit 26 includes a sensor which is activated via the actuating element 28. The sensor can be configured as a contactless sensor, for example, and accordingly the actuating element 28 is arranged spaced apart from the sensor. If the actuating element is moved, the movement is identified by the sensor and signaled by an output signal to the control unit. The actuating element 28 is fastened, for example, directly to the elastic element 30, in particular directly to the inner side 37 of the elastic element 30. The actuating element 28 can also be fastened at a different point and moved via the transmission unit. The sensor can be configured as an inductive or capacitive sensor. The sensor can also be configured as a reed sensor. Other types of sensor can also be expedient.

The actuation contour 16 is configured, in particular, such that the elevation which is brought into contact with the elastic element 30 is free of seams, edges or corners which could damage the elastic element 30.

Figures 6, 7:
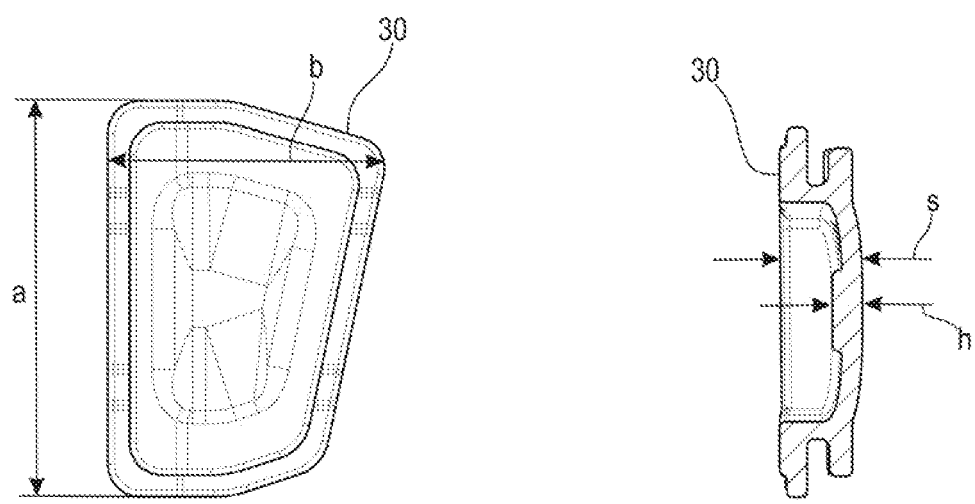
FIG. 6 shows the elastic element in a plan view.
FIG. 7 shows the elastic element in a sectional view.

As shown in FIGS. 6 and 7, the elastic element 30 has a length a, a width b and a maximum thickness s. The length a is at least 1 cm, preferably at least 1.5 cm. The length a is at most 3 cm, in particular at most 2.5 cm, preferably at most 2.0 cm. The width b of the elastic element 30 is at least 0.5 cm, preferably at least 1.0 cm. The width b of the elastic element 30 is at most 2.5 cm, preferably at most 2.0 cm, in particular at most 1.5 cm. The thickness s of the elastic element 30 is less than the length a and less than the width b of the elastic element 30. The thickness s of the elastic element 30 is preferably less than 0.5 cm. As shown in FIG. 7, the elastic element 30 has a middle section 11. The middle section 11 has a particularly small thickness h in order to permit a high degree of deformability. The thickness h is less than 50% of the thickness s of the elastic element 30. The thickness h of the middle section 11 of the elastic element 30 is preferably at most 2 mm.

It is understood that the foregoing description is that of the preferred embodiments of the invention and that various changes and modifications may be made thereto without departing from the spirit and scope of the invention as defined in the appended claims.

The invention claimed is:

1. A handheld, portable work apparatus comprising:
   a housing defining an interior space;
   a drive motor arranged in said housing for driving a tool;
   a brake device assigned to the tool;
   a hand guard for actuating said brake device;
   said hand guard being configured to be switched into an operating position and into an actuation position;
   a switching unit arranged in said interior space of said housing for detecting a position of said hand guard;
   said hand guard having an actuation contour for actuating said switching unit;
   said housing having an elastic element; and,
   said hand guard, said elastic element, and said switching unit being arranged relative to one another such that said switching unit is actuatable by said elastic element being pushed in via said actuation contour of said hand guard;
   wherein said elastic element is configured as an insert for an opening in said housing; and,
   said interior space of said housing is sealingly closed by said elastic element on said opening with respect to at least one of dirt particles and moisture.

2. The work apparatus of claim 1, wherein said switching unit is configured as a microswitch.

3. The work apparatus of claim 1, wherein said elastic element has an upper sealing lip, a lower sealing lip and a groove disposed between said upper sealing lip and said lower sealing lip; and, said housing has, on said opening of said housing, a peripheral holding contour which protrudes into said groove of said elastic element.

4. The work apparatus of claim 1, wherein said hand guard has a contact surface facing said elastic element; and, said actuation contour of said hand guard is configured as an elevation relative to said contact surface in a direction of said elastic element.

5. The work apparatus of claim 4, wherein said contact surface of said hand guard is configured as a stop relative to said housing for limiting a penetration depth of said actuation contour into said elastic element.

6. The work apparatus of claim 1, wherein said elastic element has an outer side facing said actuation contour; and, said actuation contour is in contact with said outer side of said elastic element centrally in said actuation position of said hand guard.

7. The work apparatus of claim 1, wherein said elastic element is formed from an elastomer.

8. The work apparatus of claim 7, wherein said elastomer is a soft rubber.

9. The work apparatus of claim 1, wherein the work apparatus is a motorized chain saw.

10. A handheld, portable work apparatus comprising:
    a housing defining an interior space;
    a drive motor arranged in said housing for driving a tool;
    a brake device assigned to the tool;
    a hand guard for actuating said brake device;
    said hand guard being configured to be switched into an operating position and into an actuation position;

a switching unit arranged in said interior space of said housing for detecting a position of said hand guard;

said hand guard having an actuation contour for actuating said switching unit;

said housing having an elastic element; and, said hand guard, said elastic element, and said switching unit being arranged relative to one another such that said switching unit is actuatable by said elastic element being pushed in via said actuation contour of said hand guard;

wherein said switching unit has an actuating element for actuating said switching unit; and, said actuating element is arranged adjacent to said elastic element of said housing such that said actuating element of said switching unit is directly actuatable via said elastic element.

11. A handheld, portable work apparatus comprising:

a housing defining an interior space;

a drive motor arranged in said housing for driving a tool;

a brake device assigned to the tool;

a hand guard for actuating said brake device;

said hand guard being configured to be switched into an operating position and into an actuation position;

a switching unit arranged in said interior space of said housing for detecting a position of said hand guard;

said hand guard having an actuation contour for actuating said switching unit;

said housing having an elastic element; and, said hand guard, said elastic element, and said switching unit being arranged relative to one another such that said switching unit is actuatable by said elastic element being pushed in via said actuation contour of said hand guard;

wherein said housing has a plurality of housing parts; and, said elastic element is held between two of said plurality of housing parts.

\* \* \* \* \*